United States Patent
Workman et al.

(10) Patent No.: US 8,592,775 B2
(45) Date of Patent: Nov. 26, 2013

(54) RADIATION DETECTOR HAVING A RIBBED SCINTILLATOR

(75) Inventors: Herschel Ellis Workman, Bloomington, IN (US); Craig R. Kline, Linton, IN (US)

(73) Assignee: Partec, Ltd., Bloomington, IN (US)

( * ) Notice: Subject to any disclaimer, the term of this patent is extended or adjusted under 35 U.S.C. 154(b) by 325 days.

(21) Appl. No.: 12/913,715

(22) Filed: Oct. 27, 2010

(65) Prior Publication Data

US 2012/0104265 A1 May 3, 2012

(51) Int. Cl.
*G01T 3/06* (2006.01)
*G01T 3/00* (2006.01)

(52) U.S. Cl.
USPC .............................. 250/390.11; 250/390.01

(58) Field of Classification Search
USPC ............... 250/361 R–370.15, 390.01–390.11
See application file for complete search history.

(56) References Cited

U.S. PATENT DOCUMENTS

| | | | |
|---|---|---|---|
| 3,398,278 A | 8/1968 | Splichal, Jr. et al. | |
| 5,029,262 A | 7/1991 | Schulte | |
| 5,036,202 A | 7/1991 | Schulte | |
| 5,231,290 A | 7/1993 | Czirr et al. | |
| 5,264,702 A * | 11/1993 | Mihalczo | 250/390.11 |
| 5,345,084 A | 9/1994 | Byrd | |
| 5,591,967 A | 1/1997 | Moake | |
| 5,600,144 A * | 2/1997 | Worstell | 250/363.03 |
| 5,659,177 A | 8/1997 | Schulte et al. | |
| 5,680,423 A | 10/1997 | Perkins et al. | |
| 5,783,829 A * | 7/1998 | Sealock et al. | 250/367 |
| 5,880,469 A | 3/1999 | Miller | |
| 5,940,460 A | 8/1999 | Seidel et al. | |
| 6,078,052 A | 6/2000 | DiFilippo | |
| 6,255,657 B1 * | 7/2001 | Cole et al. | 250/367 |
| 6,362,485 B1 | 3/2002 | Joyce et al. | |
| 6,495,837 B2 | 12/2002 | Odom et al. | |
| 6,529,573 B2 | 3/2003 | Olsher et al. | |
| 6,566,657 B2 | 5/2003 | Odom et al. | |
| 6,639,210 B2 | 10/2003 | Odom et al. | |
| 6,909,098 B2 * | 6/2005 | Bross et al. | 250/367 |
| 6,924,487 B2 | 8/2005 | Bolozdyna et al. | |
| 6,927,398 B2 | 8/2005 | Katagiri | |

(Continued)

FOREIGN PATENT DOCUMENTS

JP 5134049 5/1993
WO 20100099334 9/2010

OTHER PUBLICATIONS http://ortec-online.com/Solutions/homeland-security.aspx. Last visited Jan. 21, 2011.

(Continued)

*Primary Examiner* — Casey Bryant
(74) *Attorney, Agent, or Firm* — Krieg DeVault LLP; Dean E. McConnell

(57) ABSTRACT

A system for efficient neutron detection is described. The system includes a neutron scintillator formed with a number of protruding parallel ribs each side of the scintillator, forming a first set of ribs and a second set of ribs. The ribs have a protrusion height that provides a selected neutron absorption efficiency. The system includes a set of wavelength shifting fibers positioned between each adjacent pair of ribs on both the first side and the second side. Each set of wavelength shifting fibers are in optical proximity to the adjacent pair of the ribs that set of fibers are positioned between.

17 Claims, 3 Drawing Sheets

(56) References Cited

U.S. PATENT DOCUMENTS

| | | |
|---|---|---|
| 6,930,311 B1 * | 8/2005 | Riel .................. 250/390.01 |
| 6,989,541 B2 | 1/2006 | Penn |
| 7,026,627 B2 | 4/2006 | Fowler, Jr. et al. |
| 7,141,799 B1 | 11/2006 | Neal et al. |
| 7,244,947 B2 | 7/2007 | Polichar et al. |
| 7,288,771 B2 | 10/2007 | Neal et al. |
| 7,326,933 B2 | 2/2008 | Katagiri et al. |
| 7,351,982 B2 | 4/2008 | Hofstetter et al. |
| 7,372,040 B2 | 5/2008 | Policher et al. |
| 7,501,077 B1 * | 3/2009 | Hodges et al. .......... 252/301.4 F |
| 7,514,694 B2 | 4/2009 | Stephan et al. |
| 7,521,686 B2 | 4/2009 | Stuenkel et al. |
| 7,525,101 B2 | 4/2009 | Grodzins |
| 7,626,178 B2 | 12/2009 | Ivan et al. |
| 7,667,206 B1 | 2/2010 | Hindi et al. |
| 7,679,064 B2 | 3/2010 | Katagiri |
| 7,696,486 B2 | 4/2010 | Dangendorf et al. |
| 7,723,691 B2 | 5/2010 | Tonami |
| 2002/0121604 A1 * | 9/2002 | Katagiri .................. 250/368 |
| 2005/0224719 A1 * | 10/2005 | Polichar et al. .......... 250/390.01 |
| 2005/0258372 A1 | 11/2005 | McGregor et al. |
| 2007/0029493 A1 * | 2/2007 | Kniss et al. .............. 250/370.11 |
| 2009/0302231 A1 | 12/2009 | McGregor et al. |
| 2010/0226580 A1 | 9/2010 | Frank |
| 2012/0061580 A1 * | 3/2012 | Kline et al. ............. 250/390.11 |

OTHER PUBLICATIONS http://www.analytical-online.com/Products/Analytical_instru/ortecneutron.html. Last visited Jan. 21, 2011.

http://www.rtftechnologies.org/physics/fusor-mark3-neutron-detector.htm. Last visited Jan. 21, 2011.

http://www.canberra.com/products/1150.asp. Last visited Jan. 21, 2011.

International Search Report and Written Opinion, PCT/US2011/051429, ISA/US, Parttec, Ltd., Jan. 10, 2012.

English language abstract of JP5134049A, Sato, et al., May 28, 1993.

International Searching Authority. International Search Report and Written Opinion. PCT Patent Application No. PCT/US2011/051426. Jan. 9, 2012.

* cited by examiner

RADIATION DETECTOR HAVING A RIBBED SCINTILLATOR

RELATED APPLICATIONS

This application is related to, and claims the benefit of, U.S. patent application Ser. No. 12/880,505, entitled NEUTRON DETECTOR HAVING ENHANCED ABSORPTION AND BIFURCATED DETECTION ELEMENTS, which is incorporated herein by reference.

BACKGROUND

The technical field generally relates to radiation detection sensors, and more specifically but not exclusively to neutron detectors. Neutron detection depends upon having materials available that provide the ability to detect neutron events. Where neutron detection is required, the use of materials that have a high thermal neutron capture cross-section is highly desirable for neutron detectors. Where the neutron detection distinct from other background radiation types is desired, for example gamma radiation, the use of materials that also have a lower gamma ray interaction cross section is also desirable. Accordingly, a relatively small number of materials are particularly suitable for neutron detection. Enhancements to neutron absorption efficiency in neutron detectors allow the use of otherwise marginal materials, or allow improved performance from presently utilized materials. Therefore, further technological developments are desirable in this area.

SUMMARY

One embodiment is a unique radiation detector having a ribbed scintillator and wavelength shifting fibers positioned between each pair of ribs. Further embodiments, forms, objects, features, advantages, aspects, and benefits shall become apparent from the following description and drawings.

DESCRIPTION OF THE ILLUSTRATIVE EMBODIMENTS

Figure 1:
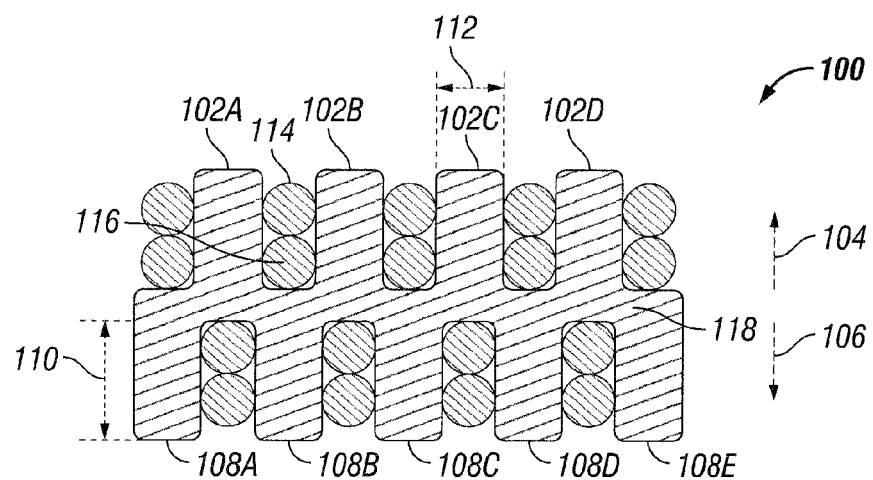
FIG. 1 is an illustration of a radiation scintillator and a number of sets of wavelength shifting fibers.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an apparatus 100 includes a scintillator body 118 having a number of parallel ribs 102a, 102b, 102c, 102d (first ribs 102) on a first side 104. The first ribs 102 are parallel but need not be vertical and may be curvilinear (either vertically or axially); however straight, vertical ribs may be easier to manufacture. Parallel, in the sense used herein, indicates that the ribs 102 do not intersect over the axial length (perpendicular to the view of FIG. 1) of the scintillator body 118, and that a wavelength shifting fiber 114 positioned between the ribs 102a, 102b maintains a similar geometrical distance relative to the ribs 102a, 102b over the axial length of the scintillator body 118. A similar geometrical distance is a distance that, in the absence of interfering features, provides similar optical communication between the ribs 102a, 102b and the wavelength shifting fiber 114 over the axial length of the scintillator body 118. The scintillator body 118 may be a single continuous piece as illustrated, or it may be formed from multiple discontinuous pieces.

Figure 4:
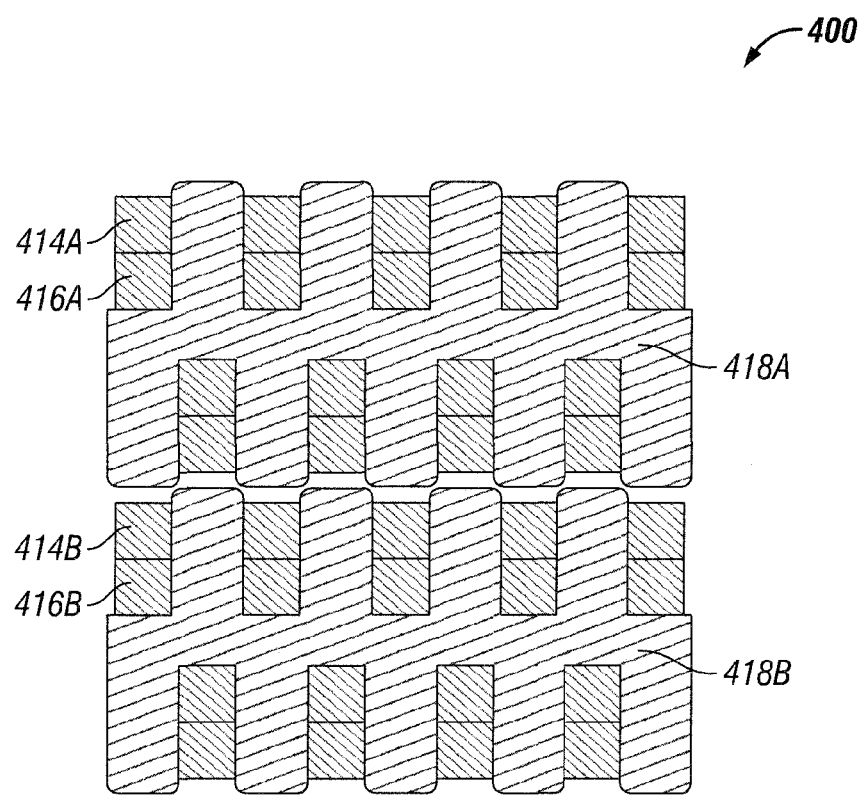
FIG. 4 is a schematic diagram of an alternate radiation scintillator and a number of sets of wavelength shifting fibers.

Referencing FIG. 4, a scintillator body 400 is formed from a first piece 418a stacked with a second piece 418b. The scintillator body 400 is provided with square fibers 414a, 414b, 416a, 416b positioned between the ribs, which improves the packing fraction of the scintillator body 400. It can be seen that, by providing a number of stacked pieces 418a, 418b of the scintillator body 400, the scintillator body 400 can be structured such that an incident radiation particle (or wave) passes through a selectable amount of the scintillator material to provide the desired detection efficiency. In one example, the protrusion height of the first ribs is provided by the combined protrusion height of ribs from the stacked scintillator body portions 418a, 418b.

Returning to FIG. 1, the number of ribs 102 provided is a function of the desired surface area of the scintillator body 118 in the relevant view for detecting radiation—for example in the illustration of FIG. 1, the relevant view is normal to radiation passing through the scintillator body vertically. The thickness 112 of the ribs 102 is selectable, with the limitation that ribs 102 that are too thick will have some re-absorption of cascading photons before they reach the neighboring fibers 114, 116, and ribs 102 that are too thin will result more fibers and related light converters than are necessary to provide the desired surface area of the scintillator body 118, increasing the cost of the apparatus 100. A rib thickness 112 between 0.5 mm to 1.0 mm is typical, but any thickness 112 may be utilized.

Any number of ribs 102, 108 that is three or greater is contemplated herein. In one example, where the scintillator body 118 is 10 cm wide, the rib thickness 112 is 1.0 mm, and the fibers are 0.3 mm O.D., the scintillator body 118 includes about 75 ribs 102. In a second example, a set of fibers (not shown) includes two columns of fibers side-by-side, with a first column of fibers adjacent to one of the two adjacent ribs, and a second column of fibers adjacent to the second of the two adjacent ribs. Where the scintillator body 118 is 10 cm wide, the rib thickness 112 is 1.0 mm, and the fibers are 0.3 mm O.D., the scintillator body 118 in the second example includes about 60 ribs 102. In a third example, where the scintillator body is 25.4 cm wide, the rib thickness 112 is 0.2 mm, and the fibers are 0.2 mm O.D. and positioned in a single column between each rib. The scintillator body 118 in the third example includes about 575 ribs.

In certain embodiments, an exemplary thickness of the first ribs and/or the second ribs is 0.2 mm, 0.22 mm, at least 0.5 mm, or about 1.0 mm. An exemplary protrusion height of the first ribs and/or the second ribs is 0.5 mm, 0.55 mm, or at least 0.6 mm. An exemplary set of the wavelength shifting fibers is at least two wavelength shifting fibers. Exemplary wavelength shifting fiber diameters include 0.2 mm or 0.3 mm. The described dimensions for ribs, scintillator body, and fiber diameters are illustrative and non-limiting.

An exemplary set of embodiments include the apparatus 100 having a neutron scintillator 118 formed with a number of protruding parallel ribs on a first side (first ribs 102) and a second number of protruding parallel ribs on a second side (second ribs 108). The number of protruding parallel ribs includes at least three ribs on each side, but may be any number of ribs according to the size of the neutron scintillator 118. In certain embodiments, the neutron scintillator 118 includes more than six ribs, more than 20 ribs, and/or more than 100 ribs. In certain embodiments, the neutron scintillator 118 includes at least 1 rib on each side per 2.0 mm of width of the neutron scintillator 118, where the ribs are wider than 0.5 mm each. In certain further embodiments, the neutron scintillator 118 includes about 1 rib on each side for each 1.6 mm of width, or about 1 rib for each 1.3 mm of width. Any embodiments including ribs to provide absorption coverage for the neutron scintillator as described herein is contemplated herein.

As is known in the art, the scintillator body 118 includes a radiation absorption material, a scintillating material, and a binder. The radiation absorption material is selected to absorb the desired type of radiation, for example neutron radiation. In certain embodiments, without limitation, the scintillator body 118 includes $^6$Li, $^{10}$B, $^6$LiF:ZnS/Ag, a P47 phosphor, and/or ($^6$LiF:Y$_2$SiO$_5$:Ce).

Positioned between each pair of the first ribs 102, the apparatus 100 includes at least one wavelength shifting fiber. Two adjacent wavelength shifting fibers 114, 116 are illustrated between the ribs 102a, 102b. The number of fibers between particular ribs 102 comprises a set of wavelength shifting fibers. The wavelength shifting fibers are fiber optic cables doped with a material that absorbs photons emitted from the scintillator body 118 and re-emits photons, a percentage of which travel down the fiber to a light converter (not shown). The light converter generates an electrical signal from the light. Exemplary light converters include a photomultiplier diode or a photomultiplier tube. A percentage of radiation incident to the scintillator body 118 is absorbed, and the scintillating material releases a cascade of photons. Some of the photons from the cascade reach a nearby fiber, and the incident radiation is thereby detected.

The apparatus 100 further includes a number of parallel ribs 108a, 108b, 108c, 108d, 108e on a second side (second ribs 108) of the scintillator body 118. The apparatus 100 also include wavelength shifting fiber(s) positioned between the second ribs 108. At the ends of the scintillator body 118, wavelength shifting fibers may optionally be provided on the outer edge of the scintillator body 118. One of skill in the art will understand the tradeoffs of detecting radiation incident to the outer rib of the scintillator body 118, the mechanical integrity of the scintillator body 118, and the exposure to shock or impact of fibers positioned on the outer rib of the scintillator body 118 to determine whether a particular embodiment should include fibers 114,116 on the outer rib or only between the ribs 102, 108.

The apparatus 100 includes the first ribs 102 parallel to the second ribs 108. In certain embodiments, the second ribs 108 may be positioned at a rotated azimuthal angle relative to the first ribs 102. The rotation of the second ribs 108 relative to the first ribs 102 may provide benefits to the mechanical integrity of the scintillator body 118, and/or may provide for easier mechanical construction of a device including the scintillator body 118 by allowing the fibers 114, 116 to exit the second ribs 108 at a selectable angle relative to the first ribs 102. However, areal coverage of radiation absorption to radiation perpendicular to the plane of the scintillator body 118 (i.e. radiation travelling vertically in the illustration of FIG. 1) is increased when the first ribs 102 and second ribs 108 are parallel and offset, as shown. The decision whether to use the second ribs 108, whether to offset the second ribs 108, and to what extent to offset the second ribs 108 from the first ribs 102 have implications for the overall absorption efficiency of the apparatus 100, and the decision is a mechanical step for one of skill in the art having the benefit of the disclosures herein.

Where the scintillator body 118 is described as having a plane herein, the plane of the scintillator body 118 may be only locally planar, where the scintillator body 118 as a whole forms a curved surface. Locally planar, as used herein, indicates that the curvature of the scintillator body 118 in the space of several of the ribs 102, 108 is approximately planar, or has a very high radius of curvature relative to the protrusion height 110 of a rib 102, 108 (e.g. radius of curvature is at least 3×, 5×, 10×, or greater than the protrusion height 110). In certain embodiments, the scintillator body 118 may not be planar, or may be planar only in certain portions of the scintillator body 118.

Figure 3A:
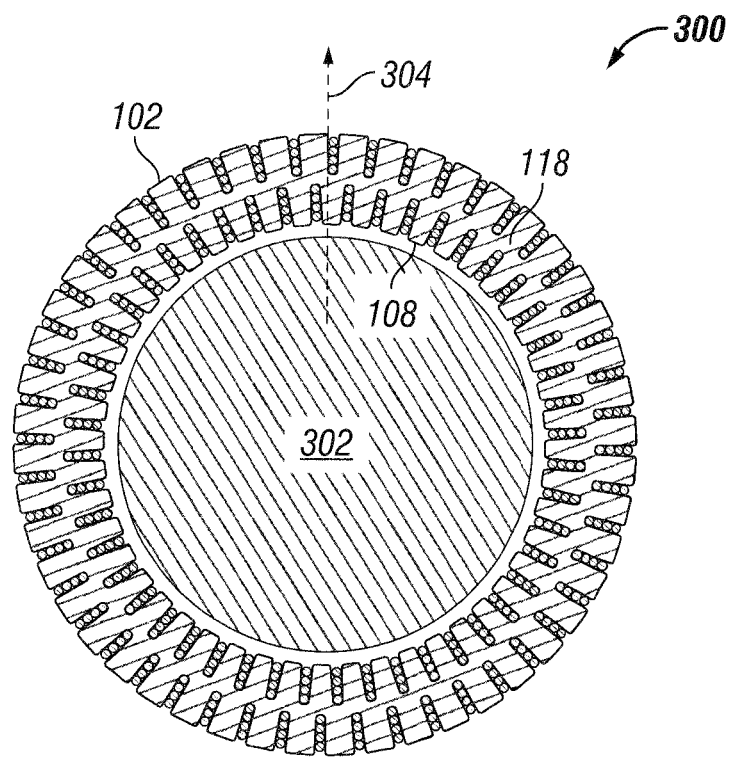
FIG. 3a is an end view of a radiation scintillator positioned around a cylindrical moderator.

For example, referencing FIG. 3a, an end view of an apparatus 300 including a curved scintillator body 118 is illustrated having first ribs 102 on an outer side and second ribs 108 on an inner side. An illustrative radiation particle 304 is shown incident to the scintillator body 118. In the example, the particle 304 is a moderated thermal neutron emitted by the moderator 302 positioned within the scintillator body 118. Because the first ribs 102 and second ribs 108 are parallel and offset, the particle 304 cannot pass through the scintillator body 118 without passing through at least one rib from either the first ribs or the second ribs, even where the particle 304 passes perpendicularly (relative to the local plane at the position of contact) through the scintillator body 118.

Figure 3B:
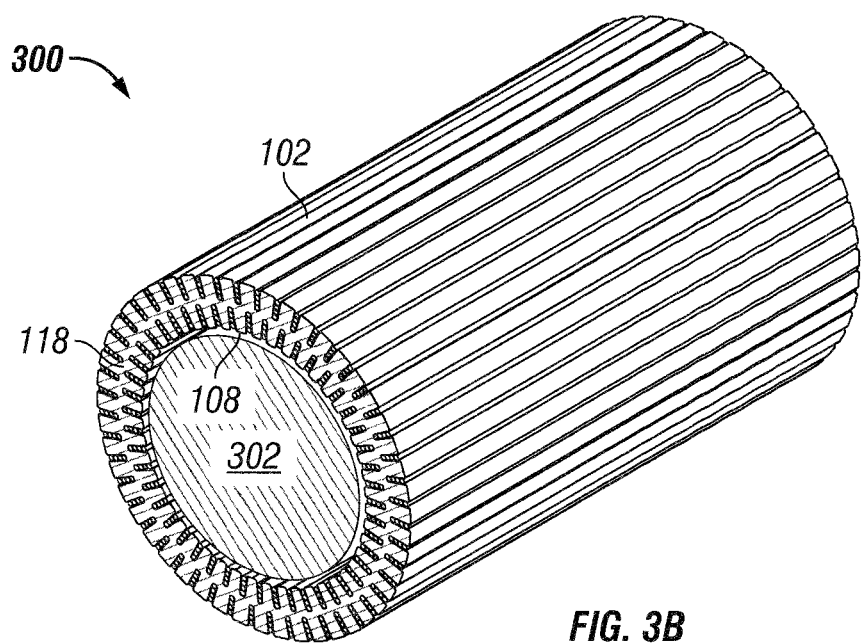
FIG. 3b is a perspective view of the radiation scintillator positioned around the cylindrical moderator.

Referencing FIG. 3b, apparatus 300 is shown in a perspective view. The apparatus 300 includes two light converters 202, 204. The fibers are routed to the light converters 202, 204 such that no two adjacent fibers 114, 116 pass to the same light converter 202, 204. For clarity of illustration, just a few fibers are shown being optically coupled to the light converters 202, 204. However, the apparatus 300 includes each fiber routed to a light converter 202, 204, and the number of light converters 202, 204 may be any number, two or more, as described herein. Additionally, each light converter 202, 204 may be optically coupled to any number of fibers as described herein.

An apparatus 300 such as that illustrated in FIGS. 3a and 3b may be optionally utilized in a directional radiation detector. In one example, the moderator 302 is a material that interacts with high energy neutrons and re-emits thermal neutrons as understood in the art. The scintillator 118 forms a cylindrical portion, as shown in FIG. 3, and the moderator 302 is positioned within the scintillator 118. The cylindrical form of the scintillator 118 and moderator 302 may be of any cross-section, including circular as illustrated in FIG. 3, and further the cross-section may be varied in shape or size in the axial direction to form whatever desired overall shape for the detector. A shield material (not shown) partially encloses the moderator 302, such that neutrons are substantially blocked from reaching the moderator 302 except from a desired detection direction. Thereby, a neutron detector may be constructed to detect a neutron source and to determine a direction of the neutron source. Exemplary shield materials include, for example, gadolinium, but any shield material understood in the art is sufficient.

The offset of the first ribs 102 and the second ribs 108 may be complete, as shown in FIG. 1, where a radiation particle (or wave) passing perpendicular to the plane of the scintillator body 118 must pass through either one of the first ribs 102 or the second ribs 108. Where the ribs 102, 108 are not vertical, the ribs 102, 108 may nevertheless be parallel in a projected angle (e.g. 30 degrees off of vertical), and offset in the projected angle, such that a radiation particle (or wave) must pass through one of the first ribs 102 or second ribs 108 regardless of the angle of the incident radiation.

The ribs 102, 108 include a protrusion height 110 from the scintillator body 118 base. The selection of the protrusion height 110, combined with the known absorption efficiency of the scintillator body 118, allows for selection of an arbitrarily high absorption efficiency of incident radiation. For example, a mean radiation absorption distance is determined according to the desired absorption efficiency and the required travel distance through the scintillator body 118 material to achieve the desired absorption efficiency. Then, a rib protrusion height 110 is selected that is at least equal to the mean radiation absorption distance. Finally, a number of wavelength shifting fibers are positioned between the ribs to provide optical detection coverage over at least the mean radiation absorption distance. The selection of the number of ribs 102, 108 is provided to cover the desired surface area of the scintillator body 118 normal to the expected radiation source (which may be a moderator in the case of thermal neutron detection).

Figure 2:
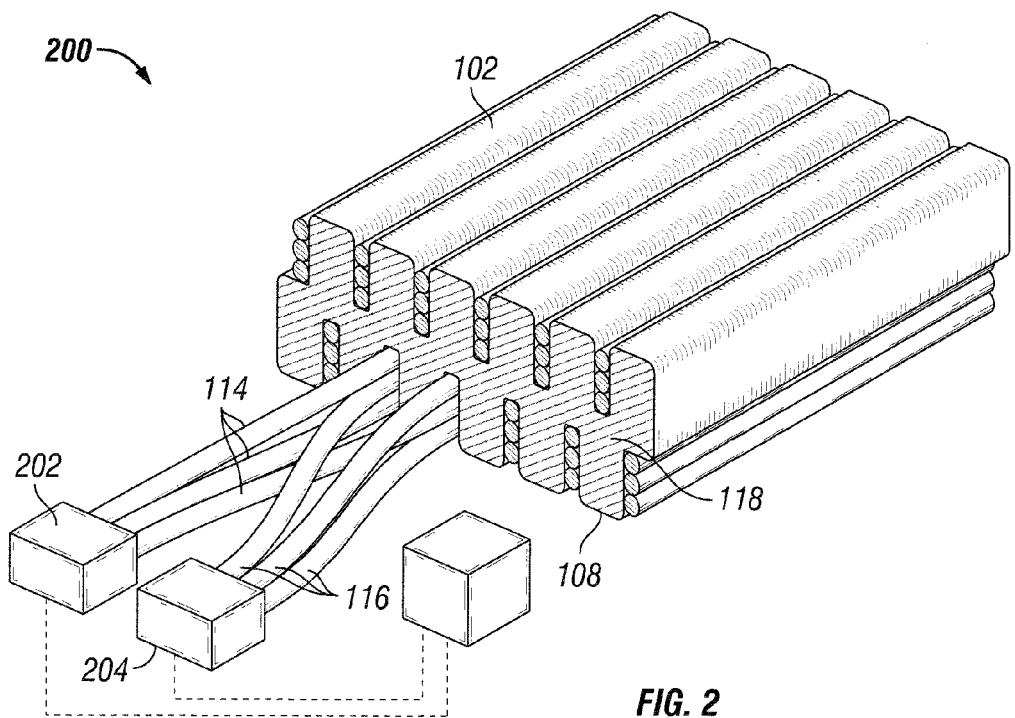
FIG. 2 is a schematic diagram of a system for high efficiency radiation detection.

Referencing FIG. 2, a system 200 is shown having a scintillator body 118, first ribs 102 on a first side, and second ribs 108 on a second side. The system 200 includes three wavelength shifting fibers between each pair of the ribs 102, 108, although any number of wavelength shifting fibers may be present as described in the section referencing FIG. 1. The system 200 further includes the fibers 114, 116 passing to light converters 202, 204. Adjacent fibers pass to different light converters 202, 204 in the example. For example, with three fibers, a high and low fiber pass to a first converter 202 and the middle fiber passes to the second converter 204. The converters 202, 204 may accept any number of fibers from between the various ribs 102, 108. However, for reasons described as follows, the number of fibers passing to each converter 202, 204 may be limited to enhance the detection capability of the system 200.

The system 200 includes a controller 206 that functionally executes certain operations for detecting radiation. In certain embodiments, the controller 206 forms a portion of a processing subsystem including one or more computing devices having memory, processing, and communication hardware. The controller may be a single device or a distributed device, and the functions of the controller may be performed by hardware or software. The controller 206 interprets two distinct electrical signals, one provided by each of two adjacent wavelength shifting fibers. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

For example, a fiber 114 is optically coupled to a first light converter 202 that provides a first electrical signal, and a fiber 116 is optically coupled to a second light converter 204. The first light converter 202 and second light converter 204 provide distinct electrical signals to the controller 206. The signals are from each of two adjacent wavelength shifting fibers positioned between one of the adjacent pairs of the ribs 102. In the example of FIG. 2, the light converters 202, 204 are optically coupled to fibers from a number of the rib 102 grooves, although in certain embodiments the light converters 202, 204 may be optically coupled to fibers from only one of the rib 102 grooves, and/or only from a single fiber.

The number of light converters 202, 204 utilized is a design choice. A low ratio of fibers per light converter provides costs and benefits. Increasing the number of light converters increase the cost of the system 200. Light converters may be photo-multiplier tubes, which are highly capable but very expensive. Where the light converters are solid state photo sensors, the costs are greatly reduced, rendering a lower fiber to light converter ratio more economical. A large number of light converters also increases the processing burden of the controller 206, and thus increases the cost of hardware and software for the controller 206 and the communications between the controller 206 and the light converters.

Decreasing the number of light converters, with the same number of fibers, increases the number of events that each light converter is experiencing. Where the controller 206 distinguishes that a neutron radiation event has occurred, rather than a gamma radiation event, in response to simultaneous signals from two adjacent fibers, there is a greater chance that two independent events will occur within a short enough time span to complicate or even prevent proper detection of neutron events if the number of fibers optically coupled to each light converter is high. For example, background gamma radiation causes photons to hit individual fibers. Where a single light converter services too many fibers, the light converter will see an amplitude excursion for a high percentage of the time that is not related to neutron events, preventing the detection of neutron events and/or causing a significant number of simultaneous amplitude excursions in other light converters potentially causing false neutron detections. Certain operations and apparatus to distinguish a neutron radiation event from a gamma radiation event using simultaneous signals from two adjacent fibers in the presence of a neutron scintillator are described in U.S. patent application Ser. No. 12/888,505 entitled "Neutron detector having enhanced absorption and bifurcated detection elements" filed on Sep. 13, 2010, and which is incorporated herein by reference in the entirety.

In certain embodiments, the ratio of fibers to light converters is between 1:1 and 9:1, inclusive. The higher limit of the ratio of fibers is limited by the background radiation flux, the size of the fiber end face, and the size of the light converter receiving face. In certain embodiments, the ratio of fibers to light converters is between 2:1 and 40:1, or between 10:1 and 40:1. In certain further embodiments, the ratio of fibers to light converters is between 10:1 and 100:1. The higher values of fiber ratios may be useful in a very low flux environment where gamma background radiation is infrequent.

The operational descriptions which follow provide an illustrative embodiment of a procedure for high absorption efficiency radiation detection. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure for high efficiency absorption and detection of radiation includes an operation to determine a neutron absorption efficiency per linear distance through a selected neutron scintillator material, and an operation to determine a desired neutron absorption efficiency for the neutron detector. The procedure further includes an operation to determine a neutron mean absorption distance in response to the neutron absorption efficiency and the desired neutron absorption efficiency, and an operation to provide a neutron scintillator having protruding ribs on each side, with first ribs on a first side and second ribs on a second side. The neutron mean absorption distance is the required linear distance for a neutron to pass through the selected neutron scintillator material before an average neutron will have a likelihood of absorption equal to the neutron absorption efficiency. For example, where the neutron absorption efficiency per linear distance is 30% of neutrons absorbed with 1.0 mm, and the desired neutron absorption efficiency is 60%, the neutron mean absorption distance is about 2.6 mm—which can be approximated by solving equation 1.

$$\eta_d = 1 - \left((1 - \eta_{ld})^{\frac{nmad}{ld}}\right). \qquad 1$$

In equation 1, $\eta_d$ is the desired neutron absorption efficiency, $\eta_{ld}$ is the neutron absorption efficiency per linear distance ld, and nmad is the neutron mean absorption distance. The neutron mean absorption distance may also readily be determined empirically, and in one example the term ld, or the standardized distance at which the absorption efficiency is known, may be equal to the neutron mean absorption distance. Where equation 1 is utilized, any converging or iterative solution for nmad known in the art may be utilized. The distance and efficiency values described are exemplary, and are readily determined for a specific material by one of skill in the art having the benefit of the disclosures herein. The procedure includes an operation to provide the protruding ribs with a protrusion height of at least the neutron mean absorption distance. The protrusion height of the ribs may be a combined protrusion height of ribs from stacked layers of scintillator body portions, for example as illustrated in FIG. 4. The exemplary procedure further includes an operation to provide the neutron scintillator with the selected neutron scintillator material, and an operation to provide the neutron scintillator to be at least locally planar, with the first ribs offset from the second ribs such that a particle passing through the neutron scintillator perpendicular to the neutron scintillator plane must pass through at least one rib from the first ribs and the second ribs. The procedure further includes providing a set of wavelength shifting fibers positioned between each adjacent pair of the first ribs and each adjacent pair of the second ribs. Each set of wavelength shifting fibers is in optical proximity to the adjacent pair of the ribs that the set of wavelength shifting fiber is positioned between. Each set of wavelength shifting fibers further includes a sufficient number of fibers to optically cover the adjacent pair of the ribs to a height of at least the neutron mean absorption distance. For example, where the neutron mean absorption distance is 0.6 mm, and the fibers have an O.D. of 0.2 mm, then a set of three fibers in a column are provided between each pair of ribs in the set of ribs.

Further detailed embodiments of the procedure are described following. An exemplary procedure further includes an operation to provide the neutron scintillator formed from $^6$Li, $^{10}$B, $^6$LiF:ZnS/Ag, a P47 phosphor, and/or ($^6$LiF:Y$_2$SiO$_5$:Ce). Exemplary values of the desired neutron absorption efficiency include at least 30% absorption of incident neutrons, at least 50% absorption of incident neutrons, at least 80% absorption of incident neutrons, and about 83% absorption of incident neutrons.

In certain further embodiments, the procedure includes an operation to determine a number of electrical signals in response to light emissions from the set of wavelength shifting fibers positioned between each adjacent pair of the first ribs and each adjacent pair of the second ribs. The procedure further includes an operation to determine the number of electrical signals by determining distinct electrical signals from any two adjacent wavelength shifting fibers, and distinguishing a neutron radiation event from a gamma radiation event in response to two adjacent wavelength shifting fibers providing simultaneous electrical signals.

As is evident from the figures and text presented above, a variety of embodiments according to the present invention are contemplated.

An exemplary set of embodiments include a system having a neutron scintillator formed with a multiplicity of protruding parallel ribs on a first side (first ribs) and a second multiplicity of protruding parallel ribs on a second side (second ribs). The multiplicity of protruding parallel ribs includes at least three ribs on each side, but may be any number of ribs according to the size of the neutron scintillator. In certain embodiments, the neutron scintillator includes more than six ribs, more than 20 ribs, and/or more than 100 ribs. In certain embodiments, the neutron scintillator includes more than 1 rib on each side per 2.0 mm of width of the neutron scintillator, where the ribs are wider than 0.5 mm each. In certain further embodiments, the neutron scintillator includes about 1 rib on each side for each 1.6 mm of width, or about 1 rib for each 1.3 mm of width. Any embodiments including ribs to provide absorption coverage for the neutron scintillator as described herein is contemplated herein.

The system includes a set of wavelength shifting fibers positioned between each adjacent pair of the first ribs and each adjacent pair of the second ribs. Accordingly, in an exemplary embodiment, each two ribs of the first side include at least two wavelength shifting fibers positioned therebetween, and each two ribs of the second side include at least two wavelength shifting fibers positioned therebetween. The outside ribs of the first ribs and the second ribs may optionally include wavelength shifting fibers at the outside position of the outside ribs. Each wavelength shifting fiber is in optical proximity to the adjacent pair of the ribs that the wavelength shifting fiber is between. In certain embodiments, two sets of wavelength shifting fibers are positioned side-by-side between one or more of the first and second ribs, and the wavelength shifting fibers are each in optical proximity to the closest rib.

In certain embodiments, the first ribs are parallel to the second ribs, and additionally the first ribs may be offset from the second ribs. In a further embodiment, the neutron scintillator is at least locally planar at the position of the first ribs and the second ribs, and the first ribs are offset from the second ribs such that a particle passing through the neutron scintillator perpendicular to the neutron scintillator plane must pass through at least one rib from the first ribs and the second ribs. Locally planar indicates that a span of the neutron scintillator having a small number of the first ribs and the second ribs is planar or includes a small enough radius of curvature, combined with appropriate shaping of the first ribs or second ribs as necessary, such that a perpendicular incident particle (or wave) to the span of the neutron scintillator must pass through at least one rib from the first ribs and the second ribs.

In certain embodiments, the width and spacing of the first ribs and second ribs is such that a particle may pass through the neutron scintillator perpendicular to the neutron scintillator plane at some positions that do not pass through at least one of the first ribs and second ribs. It will be understood that such a design reduces the overall absorption efficiency of the detector, but allows certain advantages such as potentially reduced manufacturing costs, or the insertion of supportive material within the neutron scintillator. In one example, if the ribs are 0.4 mm wide, and are spaced 1.0 mm center-to-center, then each rib will have an average 0.1 mm gap on each side (depending upon the selected offset between the first ribs and the second ribs). It is a mechanical step for one of skill in the art, having the benefit of the disclosures herein, to select rib widths, spacing, and protrusion height such that manufacturing cost, part reliability, and absorption efficiency are tailored to the specific application.

In certain further embodiments, the neutron scintillator is made from a material including $^6$Li, $^{10}$B, $^6$LiF:ZnS/Ag, a P47 phosphor, and/or ($^6$LiF:Y$_2$SiO$_5$:Ce). An exemplary thickness of the first ribs and/or the second ribs is at least 0.5 mm. An exemplary protrusion height of the first ribs and/or the second ribs is at least 0.6 mm. An exemplary set of the wavelength shifting fibers is at least two wavelength shifting fibers.

Another exemplary set of embodiments includes an apparatus for high efficiency radiation absorption and detection. The apparatus includes a scintillator body having a radiation absorptive material, a scintillating material, and a binder. The scintillator body is formed with a multiplicity of protruding parallel ribs on a first side, and at least one wavelength shifting fiber positioned between each adjacent pair of ribs. Each wavelength shifting fiber is in optical proximity to the adjacent pair of the ribs that the wavelength shifting fiber is positioned between. An exemplary apparatus includes the radiation absorptive material being a neutron absorptive material.

In certain embodiments, a number of the wavelength shifting fibers are positioned between each adjacent pair of the protruding parallel ribs. In a further embodiment, the apparatus includes a controller structured to functionally execute certain operations for radiation detection. The controller interprets two distinct electrical signals, one signal from each of two adjacent wavelength shifting fibers positioned between one of the adjacent pairs of the protruding parallel ribs, and the controller distinguishes a neutron radiation event from a gamma radiation event in response to detecting a simultaneous response from each of the two distinct electrical signals.

In certain embodiments, the apparatus further includes the scintillator body formed with a second multiplicity of protruding parallel ribs formed on a second side, and with a wavelength shifting fiber positioned between each adjacent pair of the second multiplicity of ribs. Each of the wavelength shifting fibers on the second side is in optical proximity to the adjacent pair of the second multiplicity of the ribs that the wavelength shifting fiber is positioned between. In certain embodiments, the second multiplicity of ribs are parallel to the multiplicity of ribs formed on the first side of the scintillator body, and the second multiplicity of ribs are further offset from the multiplicity of ribs on the first side. A further embodiment includes the scintillator body being at least locally planar, where the second multiplicity of ribs are offset from the multiplicity of ribs on the first side such that a particle passing through the scintillator body perpendicular to the scintillator body plane must pass through at least one rib, either a rib from the first side or a rib from the second side. The multiplicity of ribs in a single layer may be stacked for an arbitrary number of layers, either parallel or alternately offset to increase the amount of scintillator material intercepted by the neutrons, thereby increasing the probability of an interaction.

A further exemplary embodiment includes a number of the wavelength shifting fibers positioned between each adjacent pair of the protruding parallel ribs. The apparatus further includes a controller that interprets two distinct electrical signals from two adjacent wavelength shifting fibers positioned between one of the adjacent pairs of the protruding parallel ribs, and the controller distinguishes a neutron radiation event from a gamma radiation event in response to detecting a simultaneous response from the two distinct electrical signals.

Yet another exemplary set of embodiments includes a method for high efficiency absorption and detection of radiation. The method includes determining a neutron absorption efficiency per linear distance through a selected neutron scintillator material, and determining a desired neutron absorption efficiency for the neutron detector. The method further includes determining a neutron mean absorption distance in response to the neutron absorption efficiency and the desired neutron absorption efficiency, and providing a neutron scintillator having protruding ribs on each side, first ribs on a first side and second ribs on a second side, where the protruding ribs have a protrusion height of at least the neutron mean absorption distance. The method further includes providing the neutron scintillator with the selected neutron scintillator material, and providing the neutron scintillator to be at least locally planar and with the first ribs offset from the second ribs such that a particle passing through the neutron scintillator perpendicular to the neutron scintillator plane must pass through at least one rib from the first ribs and the second ribs. The method further includes providing a set of wavelength shifting fibers positioned between each adjacent pair of the first ribs and each adjacent pair of the second ribs, where each set of wavelength shifting fibers is in optical proximity to the adjacent pair of the ribs that set of the wavelength shifting fiber is positioned between, and where each set of wavelength shifting fibers includes a sufficient number of fibers to optically cover the adjacent pair of the ribs to a height of at least the neutron mean absorption distance.

Further detailed embodiments of the method are described following. An exemplary method includes providing the neutron scintillator formed from $^6$Li, $^{10}$B, $^6$LiF:ZnS/Ag, a P47 phosphor, and/or ($^6$LiF:Y$_2$SiO$_5$:Ce). Exemplary values of the desired neutron absorption efficiency is at least 30% absorption of incident neutrons, at least 50% absorption of incident neutrons, at least 80% absorption of incident neutrons, and/or about 83% absorption of incident neutrons. In certain further embodiments, the method includes determining a number of electrical signals in response to light emissions from the set of wavelength shifting fibers positioned between each adjacent pair of the first ribs and each adjacent pair of the second ribs. The method further includes determining the number of electrical signals by determining distinct electrical signals from any two adjacent wavelength shifting fibers, and distinguishing a neutron radiation event from a gamma radiation event in response to two adjacent wavelength shifting fibers providing simultaneous electrical signals.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    a scintillator body comprising a radiation absorptive material, a scintillating material, and a binder;
    the scintillator body further formed with a multiplicity of protruding parallel ribs on a first side), wherein the scintillator body forms a cylindrical portion, the apparatus further comprising a moderator positioned within the scintillator body; and
    a wavelength shifting fiber positioned between each adjacent pair of ribs, wherein each wavelength shifting fiber is in optical proximity to the adjacent pair of the ribs that the wavelength shifting fiber is positioned between; and
    further comprising the scintillator body formed with a second multiplicity of protruding parallel ribs formed on a second side, the apparatus further comprising a wavelength shifting fiber positioned between each adjacent pair of the second multiplicity of ribs, wherein each wavelength shifting fiber is in optical proximity to the adjacent pair of the second multiplicity of the ribs that the wavelength shifting fiber is positioned between.

2. The apparatus of claim 1, wherein the radiation absorptive material is a neutron absorptive material.

3. The apparatus of claim 2, further comprising a plurality of the wavelength shifting fibers positioned between each adjacent pair of the protruding parallel ribs.

4. The apparatus of claim 3, further comprising a controller structured to interpret two distinct electrical signals from each of two adjacent wavelength shifting fibers positioned between one of the adjacent pairs of the protruding parallel ribs, and to distinguish a neutron radiation event from a gamma radiation event in response to detecting a simultaneous response from the two distinct electrical signals.

5. The apparatus of claim 1, wherein the second multiplicity of ribs are parallel to the multiplicity of ribs formed on the first side of the scintillator body, and wherein the second multiplicity of ribs are offset from the multiplicity of ribs on the first side.

6. The apparatus of claim 5, wherein the scintillator body is at least locally planar, wherein the second multiplicity of ribs are offset from the multiplicity of ribs on the first side such that a particle passing through the scintillator body perpendicular to the scintillator body plane must pass through at least one rib.

7. The apparatus of claim 1, further comprising a plurality of the wavelength shifting fibers positioned between each adjacent pair of the protruding parallel ribs of the first side and the second side.

8. The apparatus of claim 7, further comprising a controller structured to interpret two distinct electrical signals from two adjacent wavelength shifting fibers positioned between one of the adjacent pairs of the protruding parallel ribs, and to distinguish a neutron radiation event from a gamma radiation event in response to detecting a simultaneous response from the two distinct electrical signals.

9. The apparatus of claim 1, further comprising a scintillator body portion positioned between the multiplicity of protruding parallel ribs on the first side and the second multiplicity of protruding parallel ribs formed on a second side.

10. The apparatus of claim 1, further comprising a neutron shielding material positioned to substantially block neutrons passing to the moderator, except in a detection direction.

11. A system, comprising:
    a neutron scintillator formed with a multiplicity of protruding parallel ribs on a first side (first ribs) and a second multiplicity of protruding parallel ribs on a second side (second ribs), wherein the neutron scintillator forms a cylindrical portion, the system further comprising a moderator positioned within the neutron scintillator;
    a set of wavelength shifting fibers positioned between each adjacent pair of the first ribs and each adjacent pair of the second ribs; and
    wherein each set of wavelength shifting fibers is in optical proximity to the adjacent pair of the ribs that set of the wavelength shifting fiber is positioned between.

12. The system of claim 11, wherein the first ribs are parallel to, and offset from, the second ribs.

13. The system of claim 12, wherein the neutron scintillator is at least locally planar, wherein the first ribs are offset from the second ribs such that a particle passing through the neutron scintillator perpendicular to the neutron scintillator plane must pass through at least one rib from the first ribs and the second ribs.

14. The system of claim 11, wherein the neutron scintillator comprises at least one material selected from the materials consisting of: 6Li, 10B, 6LiF:ZnS/Ag, a P47 phosphor, and (6LiF:Y2SiO5:Ce).

15. The system of claim 11, wherein each of the ribs from the first ribs and the second ribs comprises a thickness of at least 0.5 mm.

16. The system of claim 11, wherein each of the ribs from the first ribs and the second ribs comprises a protrusion height of at least 0.6 mm, and wherein each set of the wavelength shifting fibers comprises at least two wavelength shifting fibers.

17. The system of claim 11, further comprising a neutron shielding material positioned to substantially block neutrons passing to the moderator, except in a detection direction.

* * * * *